April 24, 1951  E. B. REEVES  2,550,085
HORIZONTALLY REVOLVING STALK CHOPPER
Filed April 29, 1948  2 Sheets—Sheet 1

Edgar B. Reeves,
Inventor,
By A. A. Fisher,
Attorney.

Patented Apr. 24, 1951

2,550,085

UNITED STATES PATENT OFFICE 2,550,085

HORIZONTALLY REVOLVING STALK CHOPPER

Edgar B. Reeves, Raymondville, Tex.

Application April 29, 1948, Serial No. 24,039

1 Claim. (Cl. 55—61)

This invention relates to stalk cutting machines for use in the field in rolling down, cutting and chopping up corn stalks or the like, so that the same may be readily turned under by the plow.

The old types of stalk cutting machines embody a heavy cylinder with cutting blades extended longitudinally therealong in angularly spaced relation, with the said blades projecting radially from the cylinder, this cylinder being rotatably mounted at the rear end of a rigidly connected frame, the frame in turn being drawn over the field by a tractor or other vehicle. In this form of assembly, however, the action is very jerky, and spasmodic, and therefore very destructive to the vehicle to which it is attached.

It is the chief object of the present invention therefore to provide a stalk cutting machine of easy and flexible action and thus designed to eliminate the destructive wear and tear on the vehicle drawing it, and which will also do a better job of stalk cutting by reason of the fact that it is freely mounted to move up and down with great force as the cylinder and blades rotate.

Another object of the invention is to provide a stalk cutting machine comprising a forwardly positioned wheel-borne frame with tongue extended therefrom as means for attachment to the vehicle provided for drawing the outfit, a rearwardly spaced cutter-reel frame having a bladed cutter-reel rotatably journaled at the lower side thereof, and pairs of connecting arms, with a pair thereof pivotally connected at their ends to the said wheel frame and cutter-reel frame, whereby as the machine is drawn over the field, the cutter-reel frame and blades are free to oscillate vertically, with the result that the blades work more effectively in cutting up the stalks, and the towing vehicle is relieved of undue strain and jerky action.

With the stated objects in view, together with such other and additional advantages as may appear from the specification, attention is now directed to the accompanying drawing as illustrating certain preferred embodiments of the invention, and wherein Figure 1 is a side elevation of the machine.

Figure 1:
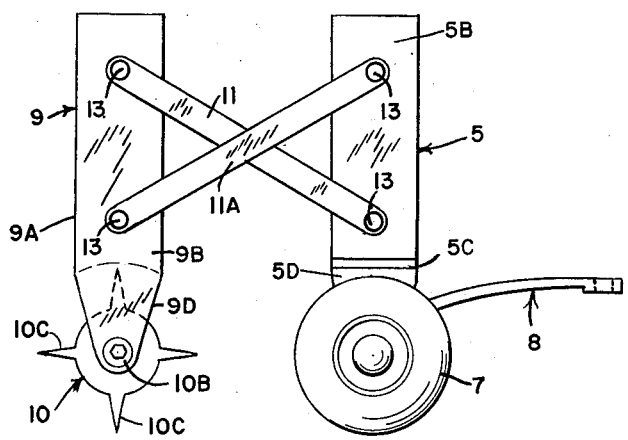

This improved stalk cutting machine comprises a forwardly positioned and elongated wheel frame 5 which may be of box-like formation as shown, and including side plates 5a, end plates 5b, and bottom plate 5c, the top side being left open. Bearing plates 5d are extended down below the bottom plate 5c in tapered form for providing axle-shaft bearing plates. An axle-shaft 6 is rigidly extended at its ends as at 6a through the pendant bearing plates 5d, and wheels 7 are rotatably journaled upon the extended ends of the shaft. A tongue 8 is extended forwardly from the axle shaft 6 as means for hitching the machine to a tractor (not shown) for drawing the machine over the field in the process of cutting stalks. This tongue includes a pair of braces 8a secured at 8b adjacent the ends of the axle shaft 6, and converged forwardly and connected with the hitch ring 8c.

A cutter-reel frame 9 is provided, the same being generally similar to the wheel frame 5, and including the side plates 9a, end plates 9b, bottom plate 9c and downwardly extended axle-shaft bearing plates 9d. A cutter-reel or cylinder 10 is provided, the same being regularly formed and of a length for positioning operatively and endwise between the bearing plates 9d of the frame 9, this reel or cylinder having an axle shaft 10a extended axially therethrough and with its extended ends journaled through the bearing plates 9d as shown at 10b in Figure 1.

A number of stalk-cutter blades 10c (four as here shown) are mounted longitudinally and in equal angularly spaced relation and extended outwardly from the periphery of the cylinder 10. As here shown this cylinder 10 is indicated as of concrete construction, with the axle shaft 10a (Figure 2) and the butts of the blades 10c embedded in the concrete, but no invention is claimed in respect of the method of forming or constructing this unit of cylinder and blades, and any other conventional method than that designated may be used.

Figure 2:
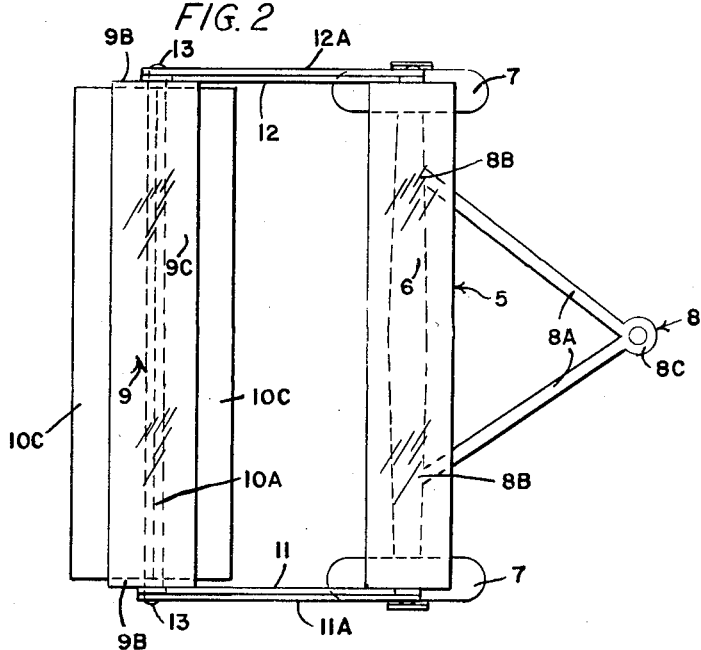
Figure 2 is a top plan view.
Figure 3:
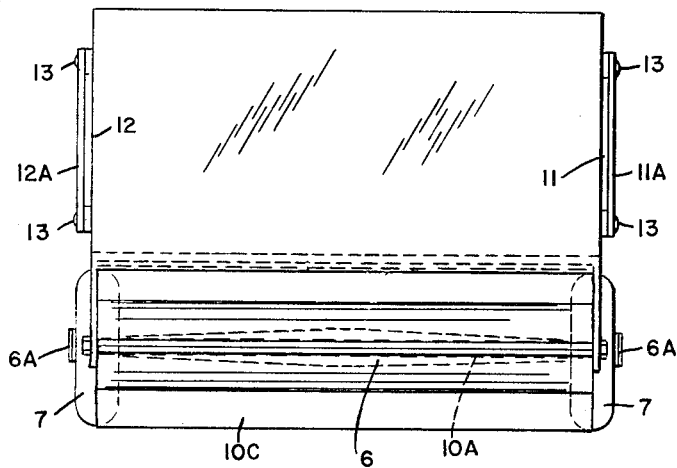
Figure 3 is a rear end elevation.
Figure 4:
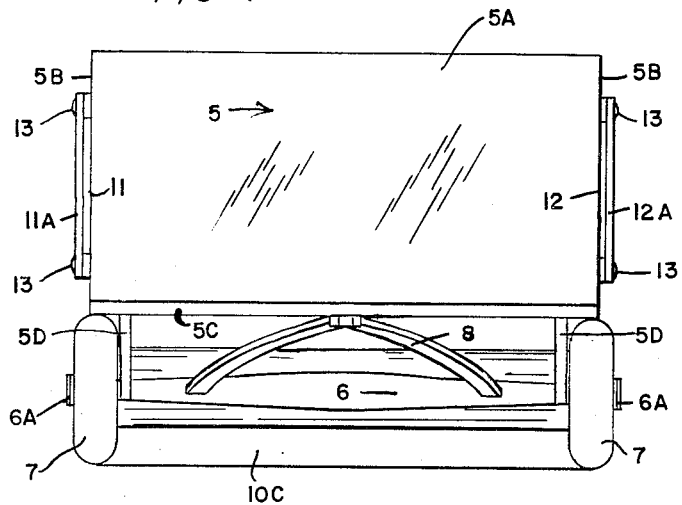
Figure 4 is a front end elevation.

The frames 5 and 9 and attachments as described, are arranged vertically, in parallel and spaced relation, as shown in Figures 1 and 2, and are pivotally and operatively linked together by pairs of flat, elongated arms 11, 11a, and 12, 12a, the arms 11, 11a being mounted at one end of the frame and the arms 12, 12a at the opposite end thereof. The arms are pivoted to the frame end plates 5b, 9b, by means of headed studs 13, which are passed through the apertured ends of the arms and anchored in vertically spaced relation in the ends of the frames, as clearly shown in Figure 1. As shown in full lines in the drawings, these arms are positioned in criss-cross relation, this arrangement being considered the more efficient method for connecting the frames, but if desired, the arms may be extended straightly and horizontally between the frames.

In operation and use, with the construction shown, the frames 5, 9, may be weighted or ballasted as desired, and as the machine is towed or drawn along over or through a field of cornstalks or the like, the stalks are crushed flat to the ground, and the vertically oscillating rear frame 9 and cutter-reel or bladed cylinder 10 will roll over the stalks, and the blades 10c thereof will work upon them in manner above described, to thoroughly chop them up into short lengths or pieces.

While I have here shown and described a preferred embodiment of the machine, and certain preferred structural features thereof, it is understood that the construction shown may be changed as desired, within the scope of the claim.

I claim:

In a stalk cutting machine of the character described for attachment behind a forwardly located wheel borne frame and including a rearwardly located and ballasted frame with a supporting and rolling stalk cutter reel, the improvement which comprises a pair of flat and elongated arms extending between the front and rear frames at each side, and said arms being pivotally attached at their respective front and rear ends to the frames at vertically spaced points, and the said arms being further arranged in criss-cross relation at each side so as to impart both upward and downward and forward and rearward chopping motions and action to the rear frame and cutter reel as the cutter reel rolls over uneven and irregular field surfaces.

EDGAR B. REEVES.

REFERENCES CITED

The following references are of record in the file of this patent:

UNITED STATES PATENTS

| Number | Name | Date |
|---|---|---|
| 151,287 | Herrold | May 26, 1874 |
| 165,128 | Smith | June 29, 1875 |
| 257,993 | Adams | May 16, 1882 |
| 273,123 | Miller | Feb. 27, 1883 |
| 818,105 | Meredith et al. | Apr. 17, 1906 |
| 1,553,462 | Newton | Sept. 15, 1925 |
| 2,322,076 | Watson | June 15, 1943 |
| 2,422,409 | Greenroyd | June 17, 1947 |

FOREIGN PATENTS

| Number | Country | Date |
|---|---|---|
| 427,185 | Germany | Mar. 30, 1926 |